(12) United States Patent
Litzenberger et al.

(10) Patent No.: US 6,728,223 B1
(45) Date of Patent: Apr. 27, 2004

(54) ECHO CANCELLER SYSTEM

(75) Inventors: Paul D. Litzenberger, Wylie, TX (US); John A. Fee, Plano, TX (US); G. Michael Eastep, McKenney, TX (US); Robert W Born, Plano, TX (US)

(73) Assignee: MCI Communications Corporation, Washington, DC (US)

( * ) Notice: Subject to any disclaimer, the term of this patent is extended or adjusted under 35 U.S.C. 154(b) by 1220 days.

(21) Appl. No.: 08/883,141

(22) Filed: Jun. 27, 1997

Related U.S. Application Data (60) Provisional application No. 60/031,082, filed on Jun. 28, 1996.

(51) Int. Cl.[7] .......................... H04B 3/20; H04L 12/50; H04L 12/28; H04J 3/04
(52) U.S. Cl. ...................... 370/286; 370/535; 370/410; 370/360
(58) Field of Search ................... 370/286, 289, 370/287, 288, 314, 270, 271, 280, 285, 535–538, 478, 360, 907; 379/410

(56) References Cited

U.S. PATENT DOCUMENTS

| | | | |
|---|---|---|---|
| 5,351,291 A | | 9/1994 | Menez et al. |
| 5,428,681 A | | 6/1995 | Andre |
| 5,450,487 A | * | 9/1995 | Lahdemake et al. ........ 370/286 |
| 5,477,534 A | | 12/1995 | Kusano |
| 5,530,724 A | * | 6/1996 | Abrams et al. ............. 379/411 |
| 5,579,305 A | | 11/1996 | Norrell et al. |
| 5,587,998 A | | 12/1996 | Velardo, Jr. et al. |
| 5,631,958 A | * | 5/1997 | Reese et al. ................ 379/410 |

* cited by examiner

*Primary Examiner*—Hassan Kizou
*Assistant Examiner*—Hanh Nguyen (57) ABSTRACT

A pool of echo cancellers provides echo cancellation on PCM digital transmissions on an as needed basis. A dynamic port device operating under the direction of call processing identifies the transmissions requiring echo cancellation and routes the identified transmissions through echo cancellers. The echo cancellation can be performed on an as needed basis without having to dedicate an echo canceller to each DS0 channel. The dynamic port device can provide multiplexing up to SONET carrier levels immediately following selective echo cancellation.

16 Claims, 4 Drawing Sheets

ECHO CANCELLER SYSTEM

CROSS-REFERENCE TO RELATED APPLICATION

This application claims the benefit of U.S. Provisional Application Ser. No. 60/031,082, filed Jun. 28, 1996.

BACKGROUND OF THE INVENTION

The present invention relates in general to the field of telephone networks and communications, and more particularly to echo cancellation in telecommunications systems.

The presence of reflected voice signals or "echo" in telephone lines is a well-known phenomenon. Modern telephone systems employ echo cancellers at various points in a transmission system to eliminate such undesirable reflected voice signals. An early example of an echo canceller is described in U.S. Pat. No. 3,500,000, issued Mar. 10, 1970.

Hybrid circuits are a common source of impedance mismatch that gives rise to the signal reflection problem that may be heard as an echo of the speaker's own voice. In addition to hybrid circuits, telephone systems have other inherent sources of reflection and signal feedback that can give rise to undesirable echo transmissions. For example, speaker phones and "hands-free" mobile phones can acoustically couple or "feedback" a portion of the sound from the phone's loudspeaker into its microphone. Conventional echo cancellers can eliminate undesirable echoes from any such additional sources, when the echo signals are correlated, as well as from the ordinary hybrid circuit.

Figure 1:
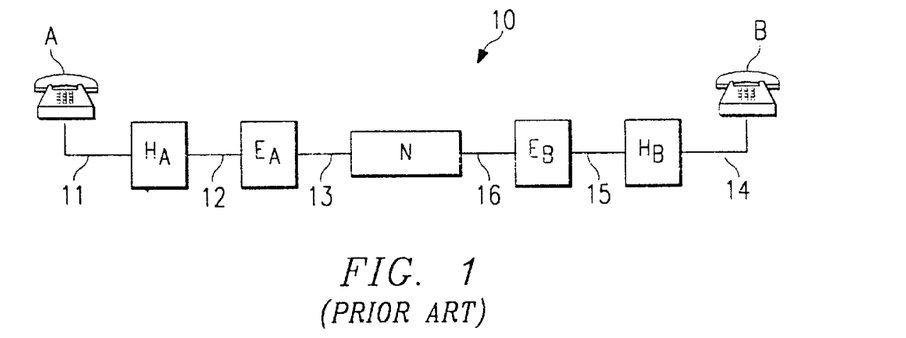
FIG. 1 is a simplified block diagram of a telephone system of the prior art employing echo cancellation.

To facilitate an understanding of the echo phenomenon, reference is made to FIG. 1 showing a simplified transmission system of the prior art, which is designated generally by reference numeral 10. The system 10 is shown connecting telephone A to telephone B through a network N. Phone A is connected by line 11 to a hybrid circuit $H_A$ which in turn is connected to an echo canceller $E_A$ by line 12. The echo canceller $E_A$ is connected to the network N by line 13. Similarly, phone B is connected through hybrid circuit $H_B$ and echo canceller $E_B$ to the network N via lines 14, 15 and 16. The lines 11 and 14 typically consist of conventional two-wire subscriber loops (or "local loops") through which analog voice signals are conducted in both directions. The hybrid circuits $H_A$ and $H_B$ separate the two-way voice signals on lines 11 and 14 to provide separate transmit and receive signals on the respective pairs of the four-wire lines 12 and 15. A hybrid circuit can be part of the subscriber's equipment or part of the phone company's equipment.

Whether an echo is perceptible, and therefore objectionable, depends upon the delay from original transmission to receipt of the reflected signal. In the example of FIG. 1, if a party using phone A is speaking, the signal must travel the distance from phone A to hybrid circuit $H_B$ on the opposite side of the network N and be reflected back to phone A. To prevent the return of such echo signal to phone A, echo canceller $E_B$ superimposes an inverted copy of the echo signal on the line 16 to cancel the actual echo signal reflected by hybrid circuit $H_B$. The echo canceller $E_B$ senses the duration for transmission from it to hybrid $H_B$ and reflection back to precisely time the cancellation function. Thus, the party speaking into phone A will not hear any annoying echoes. Similarly, echo canceller $E_A$ may be employed to remove the echo of speech transmitted by phone B and caused by signal reflection at hybrid circuit $H_A$.

More recently, digital transmission has become commonplace in telecommunications networks. As a result, sophisticated digital echo cancellers have been developed to subtract out echoes caused by reflections at various points in the transmission system. Such digital echo cancellers are well known in the art, an illustrative example being described in U.S. Pat. No. 5,418,849.

In addition to transmitting digitized voice signals, telephone systems are being used increasingly for digital data transmission, as when computers communicate with each other. A telephone technology known as Integrated Services Digital Network (ISDN) provides uniform standards and protocols for computers to send and receive digital data through the twisted-pair copper wires of the conventional local loop at relatively high transmission rates compared to "modem" technology. An important application for ISDN technology is to provide a relatively high-speed connection to the Internet via the two-wire local loop of a conventional telephone. Unlike digital voice transmissions, ISDN data transmissions do not require echo cancellation. Conventional digital echo cancellers must be disabled so that they can pass ISDN data and other digital data transmissions without applying echo cancellation.

Figure 2:
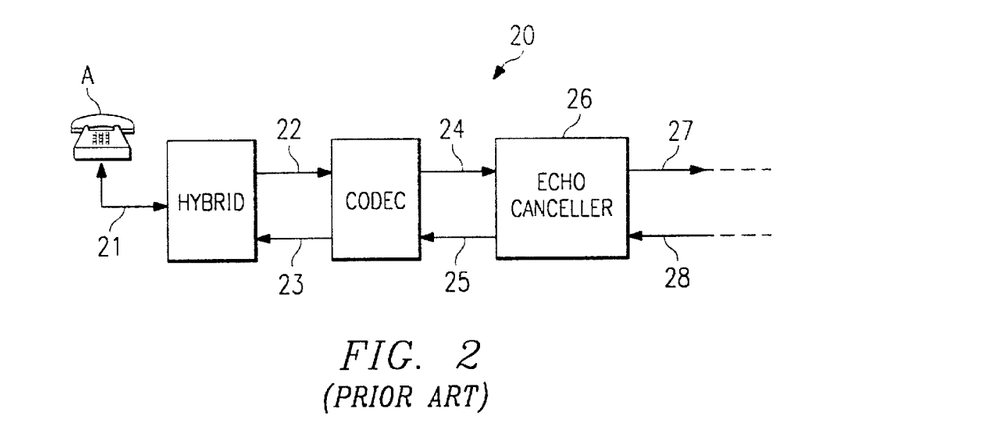
FIG. 2 is a simplified block diagram of one end of a digital transmission system of the prior art employing echo cancellation.

One end of a digital transmission system is depicted in the simplified block diagram of FIG. 2 and designated generally by reference numeral 20. A phone A used by a "near-end talker" is connected to a HYBRID circuit by a conventional subscriber loop 21 for sending and receiving analog voice signals. The HYBRID circuit provides separate communication paths 22 and 23 for "send" and "receive" signals, respectively. A conventional device known as a CODEC (coder-decoder) converts analog signals on send line 22 to digital signals on send line 24, and converts digital signals on receive line 25 to analog signals on receive line 23. A digital echo canceller 26 communicates with the telephone network (not shown) via send line 27 and receive line 28. Pulse-code-modulated (PCM) signals are communicated on lines 24, 25, 27 and 28 in accordance with network standards. The network interconnects the near-end talker using phone A with a far-end talker (not shown).

Echo canceller 26 is employed to eliminate the echo of the far-end talker's voice reflected on send path 22 by the HYBRID circuit. The far-end talker's voice signal is received on line 28 by the echo canceller 26, sensed internally and passed through as an output on line 25. From the signal on line 28 the echo canceller 26 estimates an echo signal expected to be returned on line 24. The echo canceller 26 then subtracts the estimated echo signal from the actual echo signal. The resulting signal, which may include some "residual" echo, is further processed internally by the echo canceller 26 to produce an essentially echo-free output on line 27.

In the United States, a digital multiplexing system is employed in which a first level of multiplexed transmission, known as T1, combines 24 digitized voice channels over a four-wire cable (one pair of wires for "send" signals and one pair for "receive" signals). The conventional echo canceller 26 of FIG. 2 is shown operating on a single PCM voice transmission line prior to multiplexing (or "muxing") for network transmission. The digital coding produced by the CODEC on line 24 provides 8,000 samples per second of the analog signal on line 22, each sample being represented by an 8-bit binary number. Thus, the transmission rate on line 24 is 64,000 bits per second (64 kbps).

The conventional bit format on the T1 carrier is known as DS1 (i.e., first level multiplexed digital service or digital signal format), which consists of consecutive frames, each frame having 24 PCM voice channels (or DS0 channels) of 8 bits each. Each frame has an additional framing bit for control purposes, for a total of 193 bits per frame. The T1 transmission rate is 8,000 frames per second or 1.544 megabits per second (Mbps). The frames are assembled for T1 transmission using a technique known as time division multiplexing (TDM), in which each DS0 channel is assigned one of 24 sequential time slots within a frame, each time slot containing an 8-bit word.

Transmission through the network of local, regional and long distance service providers involves sophisticated call processing through various switches and a hierarchy of multiplexed carriers. At the pinnacle of conventional high-speed transmission is the synchronous optical network (SONET), which uses fiber-optic media and is capable of transmission rates in the gigabit range (in excess of one billion bits per second). After passing through the network, the higher level multiplexed carriers are demultiplexed ("demuxed") back down to individual DS0 lines, decoded and connected to individual subscriber phones.

Echo cancelling is commonly applied at the DS0 level. It has been conventional practice to provide 24 echo cancellers per T1 line so that each DS0 channel has a dedicated echo canceller. However, as digital data transmission over telephone lines has increased (e.g., for ISDN data traffic), the percentage of DS0 channels needing echo cancellation has decreased. Unlike digitized voice, such digital data communication in a DS0 channel does not require echo cancellation. When digital data is detected, typically the call processing system has had to route the call to special trunk groups not equipped with echo cancellers, or when echo cancellation is equipped on a dedicated basis, has had to disable the echo canceller on that particular DS0 channel.

Figure 3:
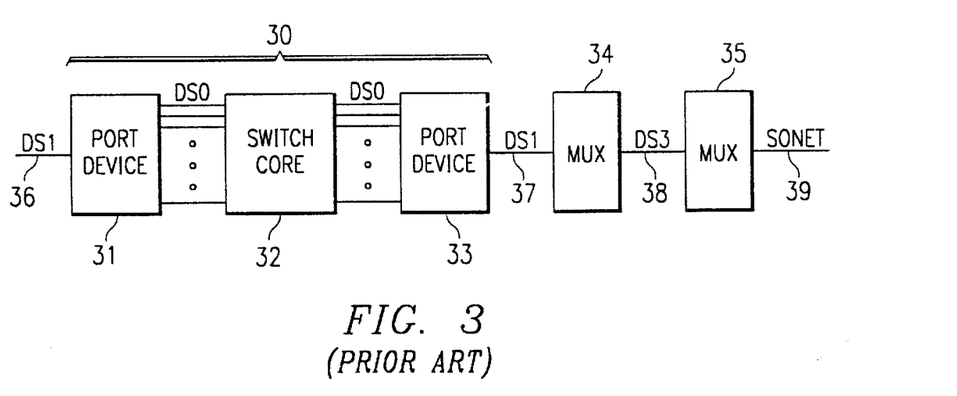
FIG. 3 is a simplified block diagram of the components of a conventional voice circuit switch in a portion of a multiplexed transmission system.

Echo cancellation may be applied at various points within a transmission system. It is common to apply echo cancellation on the network side (rather than subscriber side or "access side") of a conventional voice circuit switch operating on T1 lines. By way of illustration, FIG. 3 shows such a switch in a block diagram. The switch is designated generally by reference numeral 30 and includes an access-side port device 31, a switch core 32 and a network-side port device 33. Such switches are common in the public telephone network and facilitate the basic routing and interconnection of ordinary telephone calls and data communications over telephone lines. Multiplexers 34 and 35 are provided on the network side of the switch 30 to mux up the signals to higher rates for transmission through conventional high-speed media. For example, DS3 transmission is typically carried by a coaxial cable and combines 28 DS1 signals at 44.736 Mbps. An OC3 optical fiber carrier, which is at a low level in the optical hierarchy, combines three DS3 signals at 155.52 Mbps, providing a capacity for 2016 individual voice channels in a single fiber-optic cable. SONET transmissions carried by optical fiber are capable of even higher transmission rates.

The switch 30 is simplified in FIG. 3 to show it operating on a single DS1 line 36, but it will understood that switching among many such lines actually occurs so that calls on thousands of individual subscriber lines can be routed through the switch on their way to their ultimate destinations. Port device 31 demultiplexes the signals on DS1 line 36 to provide 24 corresponding DS0 appearances to ports of the switch core 32. The switch core 32 includes a complex matrix of electronic switches and control circuits that route the individual DS0 lines on the access side to other DS0 lines on the network side. The signals emerging on the network side of the switch core 32 are muxed back up to the DS1 level and transmitted further on line 37. DS1 carrier line 37 and other such lines (not shown) are muxed up to the DS3 level by multiplexer 34 for transmission on line 38. Similarly, DS3 carrier line 38 and other such lines (not shown) are muxed up to an optical transmission level, such as OC3, by multiplexer 35 for transmission by SONET carrier 39.

Figure 4:
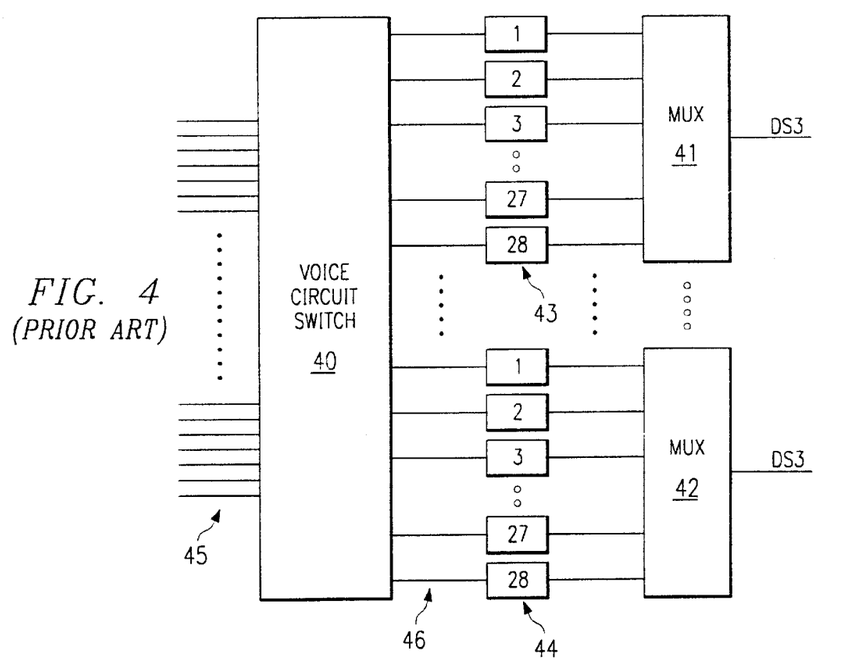
FIG. 4 is a simplified block diagram of a prior art arrangement of dedicated echo cancellers in a multiplexed transmission system.

FIG. 4 schematically depicts an arrangement of echo cancellers as commonly employed in prior art systems. A voice circuit switch 40 is shown in block diagram form but will be understood to include a switch core and port devices like those of the switch 30 of FIG. 3. The arrangement of FIG. 4 also shows two of a plurality of multiplexers 41 and 42, each muxing up 28 DS1 transmissions to the DS3 level. A group of 28 echo canceller cards, designated collectively by reference numeral 43, services the lines entering multiplexer 41, and a group of 28 echo canceller cards, designated collectively by reference numeral 44, services the lines entering multiplexer 42. The switch 40 has a plurality of T1 lines 45 entering from the access side. A corresponding number of T1 lines 46 emerge from the switch 40 arranged in groups of 28 to correspond to respective multiplexers.

Each of the echo canceller cards of the groups 43 and 44 contains 24 echo cancellers since each card services one T1 transmission line carrying 24 voice channels. Typically, the circuitry of each echo canceller is implemented in a single integrated circuit chip. Thus, it will be appreciated that each T1 line 46 has a dedicated echo canceller card, and each DS0 channel has a dedicated echo canceller chip. As an alternative to the arrangement of FIG. 4, some prior art systems have voice circuit switches with internal echo cancellers dedicated on a DS0 basis. However, whether the echo cancellers are of the internal or external type, the prior art systems typically provide a dedicated echo canceller for each DS0 channel. In some cases, groups of T1 lines are not equipped with echo cancellers and are used exclusively for digital data transmissions.

In many instances individual echo cancellers in prior art systems are maintained in a disabled state and merely pass through the DS0 signal transmissions without applying echo cancelling. This occurs either because the transmission delay is sufficiently short that echo cancellation is not needed or because digital data is being carried by the DS0 line. Also, echo cancellation may have been applied at a different point in the transmission network and thus is not needed at this particular point in the system. Because each echo canceller is dedicated to a particular DS0 line, a significant percentage of echo cancelling equipment remains quiescent at all times.

SUMMARY OF THE INVENTION

In accordance with the present invention, an echo canceller system for use in a digital telephone transmission system is provided in an efficient equipment architecture. Echo cancellers are pooled and selectively interconnected by call processing control through a pool switch matrix to individual transmission lines only in the event that a determination is made that the line requires echo cancellation.

The echo canceller pooling arrangement of the present invention permits efficient use of echo cancellers on an as needed basis. A relatively small number of echo cancelers can effectively service a relatively large number of individual transmission lines.

The pool switch matrix optionally can be configured to dynamically route either access-side transmissions or network-side transmissions to echo canceller inputs to cancel echoes coming from either direction.

The invention optionally can provide additional system efficiencies, such as combining multiplexer stages in a port device on one side of a voice circuit switch to enable direct connection of a fiber-optic cable to the multiplexed output of the port device.

The presently preferred way of carrying out the invention is described in detail below with reference to the accompanying drawings.

DESCRIPTION OF THE PREFERRED EMBODIMENTS

Figure 5:
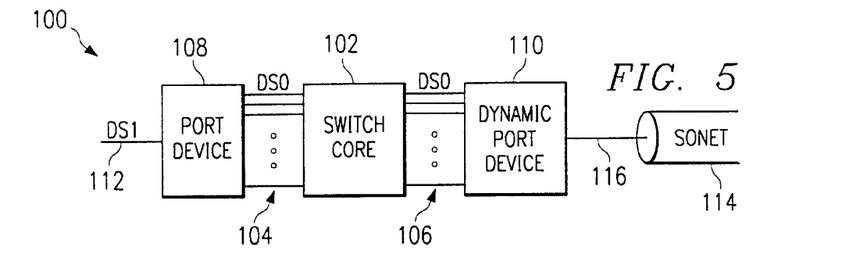
FIG. 5 is a schematic block diagram of an echo canceller system of the present invention.

With reference to FIG. 5, an echo canceller system according to one embodiment the present invention is depicted and designated generally by reference numeral 100. The system 100 includes a switch core 102 of a switch for routing incoming transmissions on lines 104 to outgoing transmissions on lines 106 and vice versa. The switch core 102 preferably comprises the conventional DS0 switch fabric and call processing functionality of the prior art switch core 32 depicted in FIG. 3. However, it will be appreciated from the following description that the invention is not limited to application with a DS0 level voice circuit switch.

In the embodiment of the invention depicted in FIG. 5, the transmissions on lines 104 and 106 are at the DS0 level. A port device 108 is provided on the access side of the switch core 102 for providing the individual DS0 appearances on lines 104 to the switch core 102. A dynamic port device 110 for facilitating the echo cancelling system 100 of the present invention is provided on the network side of the switch core 102 in communication with DS0 lines 106. Port device 108 communicates with a plurality of TDM digital transmission lines on the access side, only one of which is shown and designated by numeral 112. Typically, line 112 carries signals at a relatively low level of the digital network hierarchy, which in this example is the DS1 level.

The dynamic port device 110 performs a number of sophisticated functions including optionally multiplexing up several carrier levels. For example, the device 110 may include multiplexing capability up to a level compatible with SONET transmission through a fiber-optic cable 114. If the cable 114 is an OC3 carrier (155.52 Mbps transmission rate), an electrical synchronous transport signal (STS) is carried by line 116 at the compatible STS-3 transmission rate. Fiber-optic transmitters for converting electronic signals into light signals are well known in the art.

In accordance with an important feature of the present invention, the dynamic port device 110 performs an echo canceller pooling function, which will now be described with reference to FIG. 6. The dynamic port device 110 includes a pool switch matrix 120 in communication with DS0 lines 106 emerging from the switch core 102 (FIG. 5). A like number of DS0 lines 122 emerge from the pool switch matrix 120 and enter a multi-stage multiplexer system 124, shown for simplicity as a single box labelled "MUX" in FIG. 6. An echo canceller pool 126 is provided in communication with the pool switch matrix 120 through lines 128. Operation of the pool switch matrix 120 is managed by control circuitry 130 issuing switch commands through control lines 132, which are shown grouped together for convenience of illustration.

The control circuitry 130 is in communication with the service provider's call processing system 134, which determines which of the DS0 lines 106 require echo cancellation. For example, ISDN digital data calls contain information that identifies the transmission as digital data rather than digitized voice. Upon detecting a digital data transmission, the call processing system 134 directs the control circuitry 130 to allow the particular DS0 input line 106 to connect through the pool switch matrix 120 to a corresponding DS0 output line 122 without echo cancellation. When the call processing system 134 determines that a particular DS0 line 106 requires echo cancellation, it directs the control circuitry 130 to disconnect and interconnect selected lines in the pool switch matrix 120 to route the incoming signals on the particular DS0 line 106 through an available echo canceller in the pool 126 and then back out to a corresponding network-side DS0 line 122.

Figure 6:
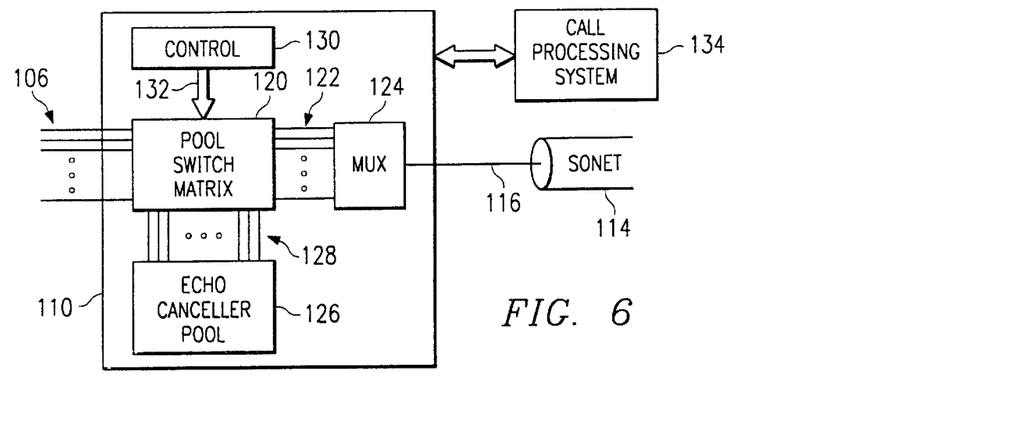
FIG. 6 is a schematic block diagram of a dynamic port device employed in the system of the present invention.

It will be appreciated that the embodiment of FIGS. 5 and 6 is merely illustrative of the invention, which can be implemented in various configurations. For example, the echo canceller pooling function can be performed on the access side of the switch core 102 by a dynamic port device in place of the conventional port device 108. In another implementation, SONET transmission can be provided on both sides of the system 100 with each port device 108 and 110 performing the required multiplexing.

Figure 7:
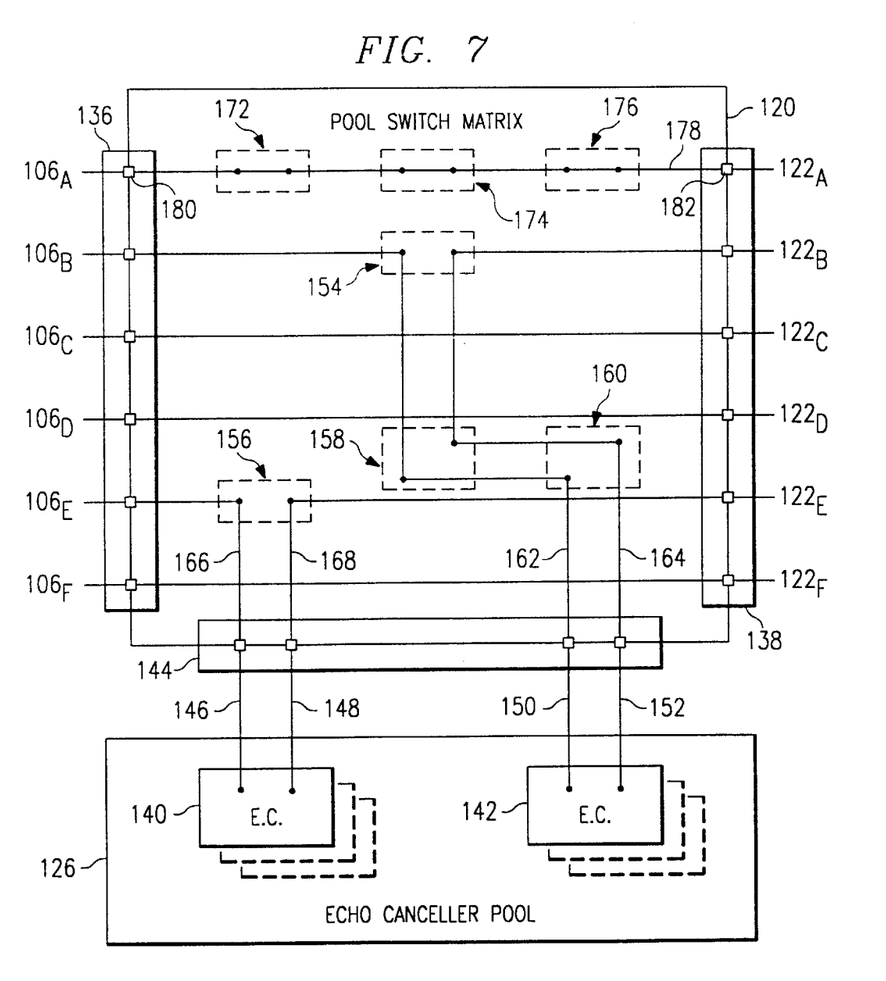
FIG. 7 is a schematic block diagram of one example of an implementation of a pool switch matrix depicting a simplified routing scheme for selectively making interconnections with an echo canceller pool in accordance with the present invention.

FIG. 7 schematically depicts the operation of the pool switch matrix 120. It will be understood that the actual switch fabric is implemented by semiconductor switches and logic circuitry using conventional switch technology. For simplicity, only six DS0 input lines $106_A$ through $106_F$ and only six corresponding DS0 output lines $122_A$ through $122_F$ are expressly shown arriving at and emerging from the switch matrix 120, though many more such lines are provided. It will also be understood that the individual DS0 lines represent conventional four-wire send/receive lines. Standard interface connectors 136 and 138 interconnect DS0 lines 106 and 122, respectively, with the pool switch matrix 120. The lines 106 are referred to as "input" lines because their send paths may include reflected signals requiring cancellation by the echo canceller pool 126. However, it will be understood that lines 106 also have outgoing transmissions on their receive paths. Likewise, the "output" lines 122 actually have both incoming and outgoing transmission on separate wire pairs.

The echo canceller pool 126 contains an array of echo cancellers, which may be provided on printed circuit boards assembled in racks (not shown). A first echo canceller 140 and a second echo canceller 142 are expressly shown, others being depicted in dashed outline. Each of the echo cancellers in the pool 126 is connected to the pool switch matrix 120 by corresponding lines, through a standard interface 144. Echo canceller 140 is connected to the switch matrix 120 via input line 146 and output line 148. It will be understood that input line 146 actually includes pairs of send/receive lines comparable to lines 24 and 25 of FIG. 2 and that output line 148 actually includes pairs of send/receive lines comparable to lines 27 and 28 of FIG. 2, the terms "input" and "output" being used in the context of FIG. 7 to correspond to the echo transmission and the echo-free transmission, respectively. Similarly, echo canceller 142 is connected to the pool switch matrix 120 via input line 150 and output line 152.

In the simplified example of FIG. 7, call processing has determined that lines $106_B$ and $106_E$ are carrying digitized voice signals that require echo cancellation, and that lines $106_A$, $106_C$, $106_D$ and $106_F$ are carrying transmissions (either voice or data) that do not need echo cancellation. Accordingly, control signals are sent into the switch matrix 120 to electronically disconnect input line $106_B$ from output line $122_B$ at point 154 and disconnect input line $106_E$ from output line $122_E$ at point 156. Transmissions on input lines $106_A$, $106_C$, $106_D$ and $106_F$ pass through the matrix 120 to corresponding output lines $122_A$, $122_C$, $122_D$ and $122_F$ without rerouting through echo cancellers. Input line $106_B$ is routed through the switch matrix 120 with intermediate electronic switching at points 158 and 160 to arrive at the interface 144 on line 162 where connection is made to input line 150 of echo canceller 142. Thus, the signals on DS0 line $106_B$ pass through echo canceller 142 and return to the switch matrix 120 on line 152. Echo canceller output line 152 is connected through interface 144 to routing line 164, which is interconnected with DS0 output line $122_B$ through matrix switch points 154, 158 and 160. Similarly, routing line 166 interconnects DS0 input line $106_E$ with input line 146 to echo canceller 140, and routing line 168 interconnects DS0 output line $122_E$ with output line 148 from echo canceller 140.

Thus, it will be appreciated that echo cancellation is selectively applied only to the transmissions on lines $106_B$ and $106_E$ in the particular simplified example. In the generalized operation of the echo cancelling system, the control circuitry 130 (FIG. 6) dynamically orchestrates routing through the pool switch matrix 120 selecting idle echo cancellers from the pool 126 to apply echo cancellation on an as needed basis. Only those DS0 lines that the call processing system 134 identifies as requiring echo cancellation are connected to an echo canceller in the pool 126. The DS0 input lines 106 that do not need echo cancellation remain connected through the matrix 120 to corresponding output lines 122 via routing lines and normally closed intermediate switch points. For example, multiple intermediate switch points 172, 174 and 176 are schematically depicted on routing line 178 interconnecting DS0 input line $106_A$ to DS0 output line $122_A$. Of course, many additional switch points and routing lines are provided in the matrix 120 but for simplicity are not shown.

As an example of a contemplated application, dynamic port device 110 (FIGS. 5 and 6) may be configured to directly serve fiber-optic cable 114 operating at the OC3 level. Thus, 2016 individual DS0 lines 106 pass through the pool switch matrix 120 and are muxed up to the OC3 level. If it is determined that the statistical probability of echo cancellation being needed within the 2016 individual circuits or channels is sufficiently low that at most one in three channels will simultaneously require echo cancellation, then the echo canceller pool 126 can be equipped with 672 echo cancellers to effectively serve the entire fiber-optic cable 114.

In the FIG. 7 embodiment the pool switch matrix 120 is depicted with each output line 122 emerging from the interface 138 at a connection point or port which corresponds in position to the connection point in interface 136 of the corresponding input line 106. For example, input line $106_A$ enters the uppermost port 180 in the interface 136, and output line $122_A$ emerges from the uppermost port 182 in the interface 138. Although such a scheme may have advantages, present switch technology readily permits dynamic reconfiguration of internal routing paths so that matrix connection to input and output line pairs need not be juxtaposed in corresponding physical positions in the input and output interface devices 136 and 138. An alternative arrangement will now be described.

Figure 8:
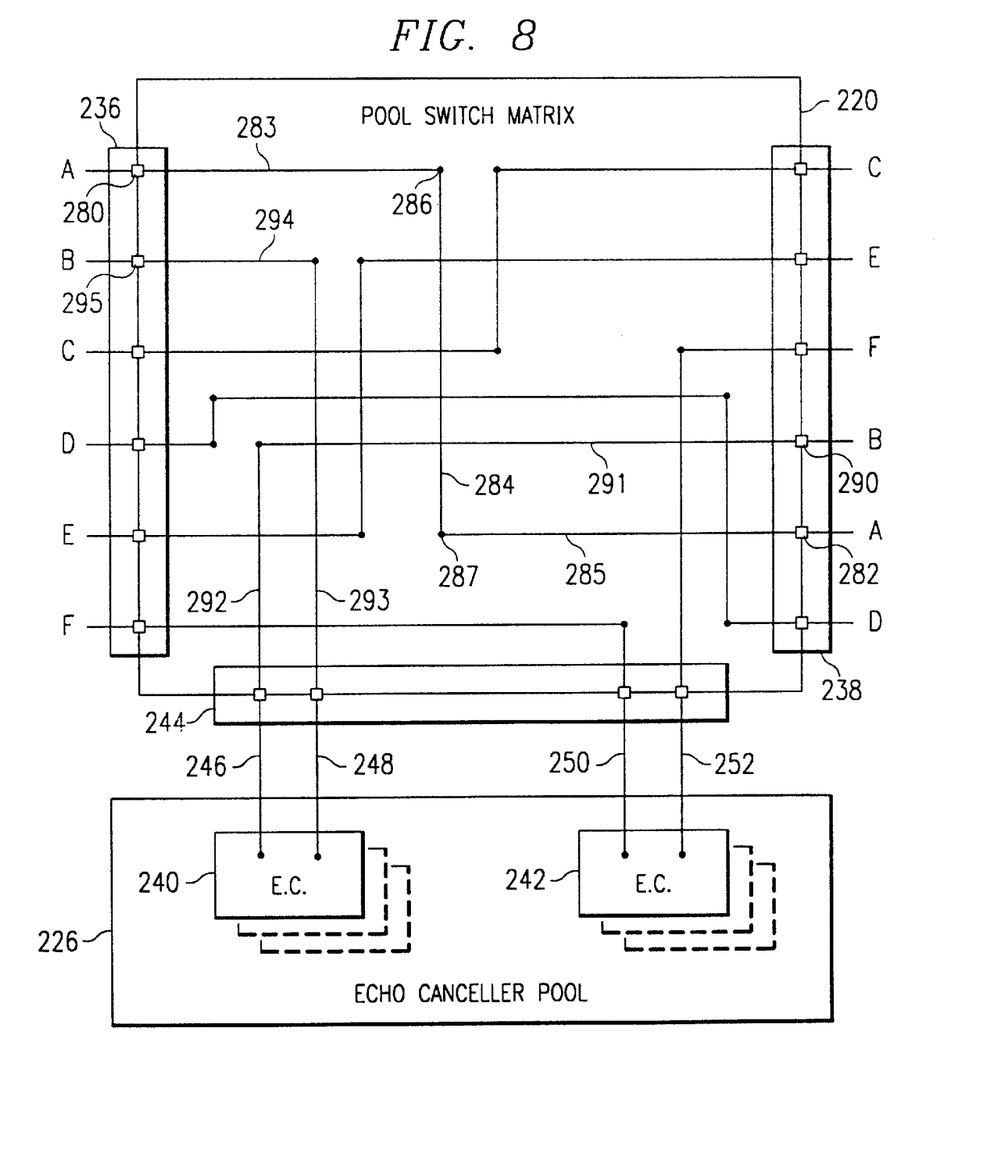
FIG. 8 is a schematic block diagram of a second example of an implementation of a pool switch matrix in accordance with the present invention.

With reference to FIG. 8 another embodiment of a pool switch matrix will be described, with similar numerals designating similar elements previously described. The pool switch matrix 220 has an interface 236 for receiving a random set of access-side transmissions on lines A, B, C, D, E and F, and an interface 238 for connection to corresponding network-side transmission lines, which in this illustrative example are ordered C, E, F, B, A and D at a particular point in time.

An echo canceller pool 226 is provided with a plurality of echo cancellers, two of which are expressly shown and labelled 240 and 242. The echo cancellers 240 and 242 communicate with the switch matrix 220 through an interface 244 via respective input lines 246 and 250 and output lines 248 and 252.

Routing lines in the switch matrix 220 interconnect the access-side lines A–F at interface 236 to corresponding network-side lines at interface 238 or to an echo canceller on an as needed basis. For example, access-side line A enters the switch matrix 220 at port 280 and corresponding network-side line A emerges from the switch matrix 220 at port 282. The interconnection between access-side port 280 and network-side port 282 is provided by routing lines 283, 284 and 285 and intermediate switch points 286 and 287. This path through the matrix is dynamically set up by switch matrix logic circuitry under the ultimate direction of the call processing system and associated control circuitry. In this case the send transmission on access-side line A has been determined not to require echo cancellation.

As an example, the send transmission on access-side line F has been determined to require echo cancellation. Thus, the switch matrix 220 sets up routing lines to run the transmissions on channel F through echo canceller 242. Thus, echo signals on the send wire of access-side line F are removed from the send wire of network-side line F prior to muxing up for network transmission.

The ability to dynamically reconfigure the pool switch matrix 220 provides additional options not available with prior art dedicated echo canceller systems. For example, echo cancelling can be applied in either direction. FIG. 8 illustrates this optional feature as to channel B. Transmissions from a long-haul carrier on the network side arriving at port 290 are routed through the switch matrix 220 by routing lines 291 and 292 to interface 244 where connection is made to the input line 246 of echo canceller 240. The output of echo canceller 240 on line 248 is routed through the switch matrix 220 by routing lines 293 and 294 to port 295 where connection is made to the access-side line for channel B. Thus, echo cancellation can be performed on echo signals arriving at the switch matrix from either direction on an as needed basis.

Although the echo canceller pools 126 and 226 of FIGS. 7 and 8 are illustrated as provided separately from their respective switch matrix devices 120 and 220, it is contemplated that the echo cancellers optionally can be integrated with the switch fabric, thus eliminating the interface connection devices 144 and 244. In such an optional architecture, the echo canceller input and output lines will consist of terminating routing lines in the switch matrix.

Those skilled in the art will appreciate that the addition of a switch matrix to the system is more than offset by the significant reduction in the number of echo cancellers employed. Further, by performing echo cancellation at the port device, several stages of multiplexing can be collapsed and assembled in a common port device to facilitate direct connection to a fiber-optic cable.

Although a preferred embodiment of the present invention has been described in detail, it will be understood that various alternatives and modifications thereof are within the spirit and scope of the invention as set forth in the appended claims.

What is claimed is:

1. A dynamic echo canceller system, comprising:
    a pool of echo cancellers, each echo canceller having an input and an output;
    a pool switch matrix connected in a telecommunications system, the pool switch matrix having a first set of ports on a first side of the matrix, a second set of ports on an opposite side of the matrix from the first side, and a set of echo canceller ports for connection to the inputs and outputs of the echo cancellers; and
    control circuitry directing the pool switch matrix to route selected transmissions between ports of different sets to permit transmission through the pool switch matrix with or without echo cancellation on an as needed basis.

2. The system of claim 1 wherein the pool switch matrix is reconfigurable to route selected transmissions from the first set of ports to certain echo canceller inputs and simultaneously route selected transmissions from the second set of ports to certain other echo canceller inputs to perform echo cancellation on transmissions coming from either direction in the telecommunications system to the pool switch matrix.

3. The system of claim 2 wherein the first set of ports are on the access side of the telecommunications system and the second set of ports are on the network side of the telecommunications system, and further comprising multiplexers disposed on the network side of the pool switch matrix and connected to a fiber-optic cable, the multiplexers, pool switch matrix, echo canceller pool and control circuitry being assembled in a common port device.

4. A dynamic port device for use in a telecommunications network comprising:
    a pool of echo cancellers for performing digital echo cancellation on a DS0 basis, each echo canceller having a first send/receive line and a second send/receive line for communication with lines of a four-wire circuit;
    a pool switch matrix connected to a set of access-side DS0 lines, a set of network-side DS0 lines and the echo canceller lines, the matrix having routing lines interconnecting each access-side DS0 line with a corresponding network-side DS0 line to provide DS0 channel paths through the matrix; and
    control circuitry dynamically reconfiguring the routing line interconnections through the matrix to route selected DS0 channels through echo cancellers to perform echo cancellation on an as needed basis.

5. The dynamic port device of claim 4 further comprising multiplexers directly interconnecting the network-side DS0 lines with a fiber-optic cable carrying multiplexed transmissions at an optical level.

6. The dynamic port device of claim 5 wherein the optical transmission level is the OC3 level.

7. The dynamic port device of claim 4 wherein the matrix is reconfigurable under the direction of the control circuitry to route selected DS0 channels through echo cancellers to perform echo cancellation on signals coming from either side of the dynamic port device.

8. An echo canceller system for use in a telecommunications network under the direction of a call processing system, the echo canceller system comprising:
    a first port device receiving transmissions at a particular digital carrier level and demultiplexing the signals onto a first set of lines operating at a lower transmission level;
    a switch core having a first side and a second side, the first side being in communication with the first set of lines emerging from the first port device, the second side being in communication with a second set of lines, the switch core including a switch matrix that routes signals on the lines of the first set to particular lines of the second set to interconnect subscriber lines at opposite ends of the network; and
    a second port device in communication with the second set of lines emerging from the switch core, the second port device including:
        (a) a pool of echo cancellers, each echo canceller having an input line and an output line;
        (b) a pool switch matrix receiving the second set of lines as matrix inputs and communicating with a third set of lines as matrix outputs, the pool switch matrix having an interface with connections to the input and output lines of the echo cancellers, a plurality of switch points and a plurality of routing lines within the matrix, each matrix input corresponding to a matrix output, the corresponding inputs and outputs being connected to each other via routing lines and intermediate switch points; and
        (c) control circuitry operating under the direction of the call processing system, the control circuitry sending control signals to the pool switch matrix to electronically disconnect selected respective matrix input and output lines at switch points and connect each such input/output line pair with the corresponding input and output lines of an available echo canceller via matrix routing lines, the lines selected for interconnection with echo cancellers being identified as requiring echo cancellation by the call processing system.

9. The echo canceller system of claim 8 wherein the pool switch matrix includes a multiplexer system connected to the third set of lines for multiplexing up the signals therein to a higher carrier level.

10. The echo canceller system of claim 9 wherein the multiplexer system multiplexes up the signals output from the port switch matrix to an optical transmission level, whereby a fiber-optic cable can be connected directly to the second port device.

11. The echo canceller system of claim 8 wherein the pool switch matrix can be dynamically reconfigured to route lines of the third set to echo canceller inputs and route corresponding lines of the second set to corresponding echo canceller outputs, whereby echo cancellation can be selectively performed on signals travelling in either direction arriving at the second port device.

12. A method of performing echo cancellation in a digital transmission network, comprising:

demultiplexing a high level multiplexed transmission to a lower level;

routing the lower level transmissions through a switch core of a voice circuit switch;

identifying a first set of transmissions requiring echo cancellation and second set of transmissions not requiring echo cancellation;

routing only the first set of transmissions through echo cancellers;

cancelling echo signals in the echo cancellers; and multiplexing both sets of transmissions up to an optical transmission level.

13. The method of claim 12 wherein the first set of transmissions are identified by a call processing system, the call processing system causing control signals to be activated in a port device containing the echo cancellers.

14. The method of claim 13 wherein the multiplexing step is performed immediately following the echo cancelling step within the port device.

15. The method of claim 12 wherein the transmissions of the first set comprise digitized voice signals and the transmissions of the second set comprise digital data signals.

16. The method of claim 15 wherein the digital data signals are ISDN digital data signals.

* * * * *